(12) United States Patent
Hoppe et al.

(10) Patent No.: US 7,851,951 B2
(45) Date of Patent: Dec. 14, 2010

(54) SECONDARY PART OF A LINEAR ELECTRICAL MACHINE, AND METHOD FOR ITS PRODUCTION

(75) Inventors: Thomas Hoppe, Hameln (DE); Markus Jakobi, Fürstenfeldbruck (DE); Hermann Sailer, Hohenkammer (DE)

(73) Assignee: Siemens Aktiengesellschaft, München (DE)

( * ) Notice: Subject to any disclaimer, the term of this patent is extended or adjusted under 35 U.S.C. 154(b) by 311 days.

(21) Appl. No.: 12/088,145

(22) PCT Filed: Sep. 7, 2006

(86) PCT No.: PCT/EP2006/066112
§ 371 (c)(1),
(2), (4) Date: Mar. 26, 2008

(87) PCT Pub. No.: WO2007/036415
PCT Pub. Date: Apr. 5, 2007

(65) Prior Publication Data
US 2008/0246350 A1 Oct. 9, 2008

(30) Foreign Application Priority Data
Sep. 26, 2005 (DE) .................. 10 2005 045 900

(51) Int. Cl.
*H02K 41/00* (2006.01)
(52) U.S. Cl. .............. 310/12.01; 310/12.23; 310/12.07; 310/12.27; 310/45; 29/596

(58) Field of Classification Search .............. 310/12.01, 310/12.02, 12.07, 12.19, 12.23, 12.24, 12.25, 310/12.26, 12.27, 12.33; 29/596–598
See application file for complete search history.

(56) References Cited

U.S. PATENT DOCUMENTS

| 6,930,413 B2 * | 8/2005 | Marzano .................. 310/12.18 |
| 2003/0137199 A1 * | 7/2003 | Morel et al. .................. 310/12 |
| 2006/0125327 A1 * | 6/2006 | Sogabe et al. .................. 310/12 |

FOREIGN PATENT DOCUMENTS

DE 298 07 438 U1 7/1998

(Continued)

*Primary Examiner*—Quyen Leung
*Assistant Examiner*—Leda Pham
(74) *Attorney, Agent, or Firm*—Henry M. Feiereisen; Ursula B. Day

(57) ABSTRACT

The invention relates to a secondary part (2, 3) of a linear electrical machine (5), wherein the secondary part (2, 3) has permanent magnets (11) and a mount (13). The secondary part (2, 3) has spacer elements (9), wherein an installation height of the secondary part (2, 3) is also determined by means of the spacer elements (9). Tolerances of the installation height can be maintained more easily by means of the spacer elements. In a method for manufacturing a secondary part (2, 3) of a linear electrical machine (5), the spacer elements (9) are cast together with the mount (13) on which the permanent magnets (9) are arranged such that the permanent magnets (9) are embedded in the casting compound (15) and the casting compound (15) forms the surface of the secondary part (2, 3) in the region of the permanent magnets (11), wherein the spacer elements (9) protrude out of the casting compound (15) such that part of the surface of the secondary part (2, 3) is also formed by the spacer elements (9).

17 Claims, 2 Drawing Sheets

FOREIGN PATENT DOCUMENTS

| | | |
|---|---|---|
| DE | 199 36 064 A1 | 2/2001 |
| JP | 62193534 A | 8/1987 |
| JP | 3265458 A | 11/1991 |
| JP | 11027912 A | 1/1999 |
| WO | WO 03-003538 A2 | 1/2003 |

* cited by examiner

SECONDARY PART OF A LINEAR ELECTRICAL MACHINE, AND METHOD FOR ITS PRODUCTION

BACKGROUND OF THE INVENTION

The invention relates to a secondary part of a linear electrical machine. The linear electrical machine is, in particular, a linear motor. If the linear motor is a synchronous motor, then the linear motor can also easily be used as a generator.

The linear electrical machine has a primary part and a secondary part. These machine parts can be produced with high dimensional accuracy. This relates in particular to the height dimensions of the linear electrical machine, for example the height of the external size, or else the height of an air gap between the primary part and the secondary part. Compliance with specified tolerances requires manufacturing effort, and is therefore costly. The large amount of manufacturing effort is incurred, for example, by a manufacturer of the secondary parts or else by a supplier of semi-finished goods for production of the secondary parts of the linear electrical machine.

The secondary part has a mount to which the permanent magnets are fit. This means that the permanent magnets are positioned on this permanent-magnet mount. The mount— the permanent-magnet mount—is, for example, in the form of a mounting plate which has been manufactured from an iron plate. The height of the mount is its thickness in which case, for example, the thickness may be 6 mm to 12 mm. By way of example, the thickness tolerance is ±0.2 mm or else ±0.5 mm. The tighter the tolerance, the more complex it is to produce.

The height of the secondary part therefore depends both on the height of the permanent magnets and on the height of the mount. The height of these parts in this case relates to the size on a plane on which the air gap height can also be measured between the primary part and the secondary part.

The secondary part may also have encapsulation. The encapsulation can also influence the height of the secondary part. The material of the encapsulation which is located in the area of the air gap has a thickness, for example, of about 0.4 mm. Depending on the tolerances of the mount and of the permanent magnets, the thickness of the encapsulation is normally subject to a tolerance of ±0.25 mm. The air gap width is the height of the air gap. The narrower the air gap is, the greater is the power produced by the electrical machine. If the air gap has different widths, depending on the height of the permanent magnets, this has a negative effect on the machine behavior since, in consequence, the magnetic flux is different and the achievable electromotive force (EMF) is therefore also different. A secondary part which has encapsulation is known, for example, from DE 199 36 064 A1.

A specified tolerance for the installation height of the secondary part can be ensured either by using secondary-part components which do not exceed specific tolerances or by subsequently matching the height of the secondary part by means of a reworking process. Both involve a large amount of effort. Further problems can occur, in particular if the mount is reworked. The thickness of a mount, which also governs the installation height of the secondary part, can be adjusted, for example, by means of grinding or by means of a milling process. Grinding is extremely time-consuming. In the case of a mount produced from a rolled metal sheet for permanent magnets, the milling process leads to bending since the rolling process results in internal stresses in the rolled metal sheet. This problem could admittedly be overcome, for example by an annealing process, but this requires a large amount of effort.

SUMMARY OF THE INVENTION

The invention is therefore based on the object of specifying a method for production of a secondary part of a linear electrical machine, and the secondary part itself, by means of which it is easier to comply with an installation height of the secondary part.

According to one aspect of the invention, the object is achieved by a secondary part of a linear electrical machine, with the secondary part having permanent magnets and a mount, wherein the secondary part has a spacing element, with the installation height of the secondary part also being governed by means of at least one spacing element.

According to another aspect of the invention, the object is achieved by a method for production of a secondary part of a linear electrical machine, with the secondary part having permanent magnets which are arranged on a mount, wherein the spacing elements are encapsulated together with the mount, on which the permanent magnets are arranged, such that the permanent magnets are embedded in the encapsulation and, in the area of the permanent magnets, the encapsulation forms the surface of the secondary part, with the spacing elements projecting out of the encapsulation such that a part of the surface of the secondary part is also formed by the spacing elements.

A secondary part of a linear electrical machine which has a primary part and the secondary part has permanent magnets. The linear electrical machine is, in particular, a linear motor, although, for example, this can also be operated as a generator. The permanent magnets are positioned on a mount. The mount is a permanent-magnet mount. The secondary part also has at least one spacing element, in particular with two or more spacing elements being provided for the secondary part. The installation height of the secondary part can be influenced by means of the spacing element or elements. The installation height therefore depends on at least one spacing element. The installation height of the secondary part is in this case an external dimension of the secondary part. The installation height is in this case a dimension which is measured in a direction which also relates to the air gap width between the primary part and the secondary part. The installation height of the secondary part can also be governed by means of at least one spacing element. The greater the height that is chosen for a spacing element, the greater is the installation height of the secondary part. The installation height is the height of the secondary part, with the height being measured from a base on which the secondary part rests to the surface adjacent to the air gap of the electrical machine.

The use of spacing elements reduces the dependency on the need to use exactly rolled and subsequently ground mounting plates to form the mount for the permanent magnets.

If the secondary part has a plurality of spacing elements, then they can be used to compensate for unevenness at the installation location of the electrical machine. For example, spacing elements of different height are used to compensate for unevenness. The different height may be achieved, for example, by a grinding process, by a milling process or else by the use of shims. The spacing elements therefore represent feet of the secondary part allowing it to be mounted more easily and simply on different foundations. One example of a foundation is a machine bed.

In one advantageous refinement of the secondary part, the spacing element is adjacent to the mount. The mount for the permanent magnets is connected to the spacing element for example by means of an adhesively-bonded joint or else by means of a welded joint. After being joined in this way, the secondary part can be encapsulated. The resultant encapsulation at least also holds the spacing elements.

The secondary part can therefore be designed such that, in addition to a mount which, for example, is a mounting plate, and a number of permanent magnets arranged on this mount, it has an encapsulation body in which the permanent magnets are embedded and which defines the external shape of the secondary part, at least with regard to the permanent magnets. On the one hand, this results in the permanent magnets being reliably fixed on the mounting plates and being protected against external influences, while on the hand structural elements that are required can be formed in the encapsulation body during the encapsulation process. Structural elements such as these are, for example, recess areas for attachment screws, or stamped areas on the outside of the encapsulation body, for example with motor characteristic data manufacturer etc. In order to obtain a continuous permanent-magnet surface and to avoid gaps being formed as a result of shrinkage after encapsulation, a non-woven fabric, preferably a glass-fiber non-woven is preferably located between the surface of the permanent magnets and the outer surface of the encapsulation body. The encapsulation body is preferably composed of a plastic or synthetic resin, with particularly suitable materials being polyurethane or epoxy resin.

In one preferred embodiment of the method according to the invention the mounting plate has no holes through it but just attachment plugs which are open outwards on one side. The mounting plate can therefore easily be stamped out of a metal plate or, preferably, can be cut out by means of a laser, to be precise in a continuous cutting process. The permanent magnets are then positioned on the metal plate and secured against movement, for example by quick-setting adhesive. In this case, it is particularly advantageous to use a positioning tool which is placed on the mounting plate and has recesses or compartments for the permanent magnets, into which the permanent magnets are individually inserted. The spacing elements can be positioned under the attachment lugs or the through-holes.

In order to form the encapsulation body, the mounting plate together with the permanent magnets is preferably placed in a mold, with the mold being complementary to the structure of the encapsulation to be formed, for example with recess areas for screw heads and the like.

A further refinement of the secondary part has a mount with permanent magnets, which mount has one or more recesses. The single recess or the multiplicity of recesses is or are located on the face of the mount which is opposite the face on which the permanent magnets are positioned. The recesses are therefore located on a lower face of the secondary part, facing away from the primary part. The spacing element can be fit into the recess. For example, the spacing element is adhesively bonded and/or pressed into the recess. If the spacing elements, which are used as feet, have identical lengths, than the height of the secondary part can be varied by the depth of the recesses. The spacing elements are moved to the bottom of the recess, where they are positioned. In a further refinement, different recesses have different depths. The depth relates to a dimension which can be measured in the same direction as the width of the air gap. Recesses with different depths can also advantageously be combined with spacing elements of different height.

If the secondary part has spacing elements of different height, then these different heights can either be produced by reworking of the spacing elements after installation in the secondary part, or else even prior to installation by the use of spacing elements of different height for installation.

In a further advantageous refinement of the secondary part, the spacing element or the spacing elements is or are composed of a thermally conductive material. The spacing elements are therefore also thermally conductive. The thermally conductive characteristic of the spacing elements allows thermal energy to be dissipated from the mount. By way of example, the thermal energy is passed to a tool bed or else to a cooling device.

The secondary part can also be developed in such a way that it has encapsulation at least on that face of the mount which faces away from the permanent magnets, in particular with the entire surface of the secondary part or at least the majority of it being formed by the encapsulation and by the spacing element or elements. By way of example, the spacing elements can be produced from aluminum, stainless steel, high-strength plastic or the like. Materials such as these are resistant to corrosion. This corrosion resistance is provided for the mount which, for example, is produced from iron by completely sheeting it with the encapsulation, apart from the spacing elements and the permanent magnets. By way of example, this means that there is no need for the mount to be galvanized.

According to the invention, a secondary part, can also be produced using a specific method. Spacing elements which are used for installation of the secondary part are used in the method according to the invention for production of the secondary part of a linear electrical machine. The secondary part has permanent magnets which are arranged on a permanent-magnet mount, known for short as a mount. The spacing elements are encapsulated together with the permanent-magnet mount, on which the permanent magnets are arranged, such that the permanent magnets are at least partially embedded in the encapsulation, and, the encapsulation forms the surface of the secondary part in the area of the permanent magnets. The encapsulation forms an encapsulation skin on the permanent magnets, and this can be set, for example, to have a thickness of, for example, 0.4 mm±0.05 mm. The spacing elements can be held on the secondary part by the encapsulation. The spacing elements in this case advantageously project out of the encapsulation such that the spacing element also forms a part of the surface of the secondary part. This has the advantage that the advantageously stiff spacing elements are connected to a stiff mount, in which case the spacing elements may, for example, be placed on a stiff machine bed thus allowing the secondary part to be stiffly connected to the machine bed. By way of example, the connection is produced by screw connection.

Spacing elements of different height can be used for this method. This makes it possible to influence the installation height of the secondary part and to compensate for unevenness at the installation location of the electrical machine, as well. The method can also be modified such that the height of one spacing element or else of a plurality of spacing elements is reduced. By way of example, the height of at least one spacing element is reduced by grinding and/or by a milling process.

In a further refinement of the method according to the invention, recesses for holding the spacing elements are produced in the mount, in particular with recesses of different depths being produced. For example, if spacing elements of the same height are introduced into the recesses of different depth and are placed on the bottom of the recess, this makes it possible to achieve different heights for the overall secondary part. The secondary part may in this case have one height, or else different heights at different points.

A secondary part according to the invention can be produced by a method such as this.

Sufficiently high spacing elements must be used for subsequent machining of the spacing elements, which act as feet for the secondary parts. The spacing elements may be formed from one or more parts.

BRIEF DESCRIPTION OF THE DRAWING

Examples for implementation of the invention will be explained with reference to the attached drawings, in which.

DETAILED DESCRIPTION OF PREFERRED EMBODIMENTS

Figure 1:
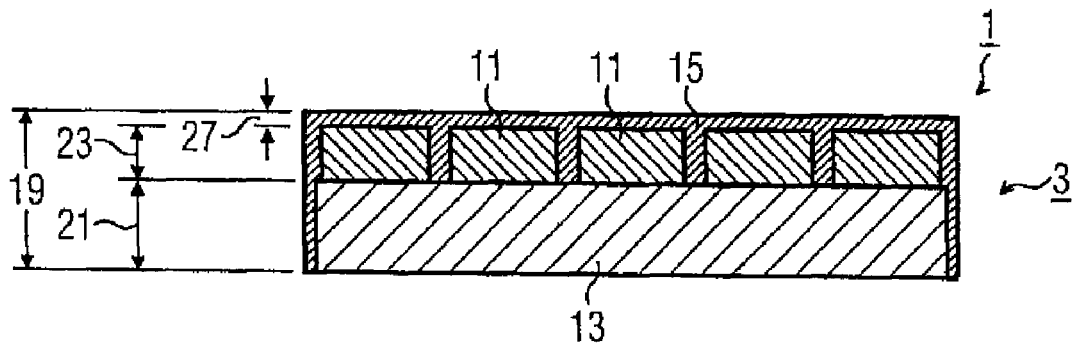
FIG. 1 shows a schematic cross section through a secondary part according to the prior art.

The illustration in FIG. 1 shows, schematically, a cross section through a secondary part 1 according to the prior art. The secondary part 1 has a mount 13 and permanent magnets 11. The permanent magnets 11 are positioned on the mount 13 such that the mount 13 can also be referred to as a permanent-magnet mount. The permanent magnets 11 are encapsulated with encapsulation 15. The secondary part 1 has an installation height 19. The installation height is the height of the secondary part, with the height being measured in the direction of an air gap width of an air gap between the secondary part and a primary part, which is not illustrated. The height 19 of the secondary part 1 is therefore composed of the height 21 of the mount 19, the height 23 of the permanent magnets 11 and the height 27 of the encapsulation 15 above the permanent magnets 11. This height 27 of the encapsulation 15 can also be referred to as the thickness of the encapsulation above the permanent magnets 11. The location statement "above" means an area between the permanent magnet 11 and the air gap, which is not illustrated.

Figure 2:
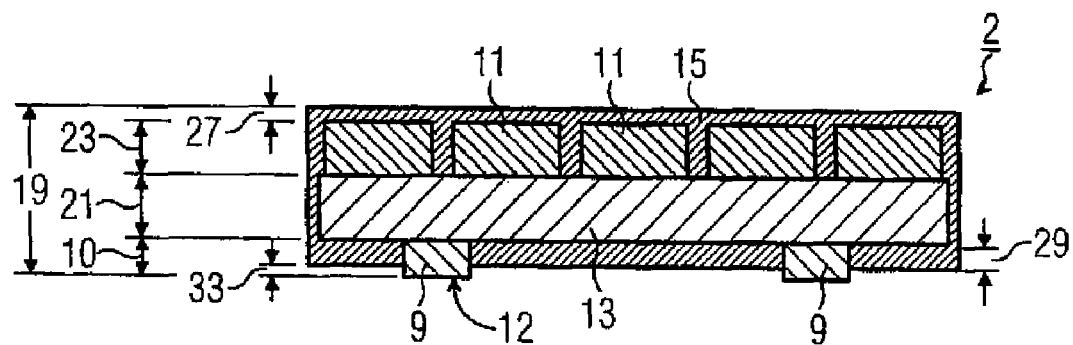
FIG. 2 shows a schematic cross section through a first exemplary embodiment of a secondary part according to the invention.

Like FIG. 1, the illustration in FIG. 2 shows a secondary part of an electrical machine, with the electrical machine being a linear machine. The linear machine is, in particular, an electrical synchronous linear motor. The secondary part shown in FIG. 2 has spacing elements 9. The spacing elements 9 are intended to rest, for example, on a machine bed, and rest on the mount 13. The mount 13 is fitted with the permanent magnets 11 and, for example, is cut out of a metal plate. During the production of the secondary part 2, once the metal plate 13 has been cut out and, if necessary, its surface has been cleaned and roughened, permanent magnets 11 are then placed on the mount 13. A positioning tool is preferably used in order to position the permanent magnets 11 on the mount 13, although this is not illustrated. The positioning tool is, in the simplest case, a frame with individual compartments for holding the permanent magnets 11. When all the permanent magnets 11 have been positioned on the mount 13, and have been secured against movement, for example by adhesive bonding, the frame can be removed again. The mounting plate 13 formed in this way with permanent magnets 11 is then introduced into a mold, which is not illustrated in the FIG., in order to carry out the encapsulation process. The encapsulation completely embeds the permanent magnets 11 in the encapsulation body, with the permanent magnets 11 being covered on the side facing away from the mount 13 with a layer with a thickness 27 of, for example, about 0.4 mm, thus, for example, protecting it against damage and corrosion.

The spacing elements 9 project into the encapsulation 15 with an embedding depth 29 of, for example, several millimeters. The distance 33 from the bottom can be determined from the embedding depth 29 and the overall height 10 of the spacing element 9. The distance 33 from the bottom is the height of the spacing elements 9 projecting out of the encapsulation 15.

A primary part 2 that has been produced should have a specific installation height 19 within a specific tolerance band. The tighter the tolerances, the better is the quality. The tolerances of the second part 2 are accumulated from the tolerances of individual components. Individual components are the mount 13 and the permanent magnets 11. The permanent magnets 11, for example, have a tolerance in the height 23 of the permanent magnets 11 of ±0.05 mm, and the mount has a tolerance in the height 21 of the mount 13 of, for example, ±0.5 mm.

Until now, the overall height of the mount 13 has had to be reduced in order to subsequently achieve the tolerance for the installation height 19. This was done, for example, by grinding or milling away the mount 13 on the side facing away from the permanent magnets 11. This procedure involves a large amount of effort. The use according to the invention of the spacing elements 9 also allows the installation height to be adapted with respect to the tolerance band to be complied with. The installation height tolerance, that is to say the overall height tolerance, can be complied with by a subsequent machining of the spacing elements. For example, one end surface 12 of the spacing element 9 is milled away during the machining process.

The height of the spacing elements 9 may be chosen as a function of the thermal energy to be dissipated through the spacing elements 9. The greater the amount of energy to be dissipated, the larger is the end surface 12.

If the aim is not to machine the spacing elements after they have been fitted to the secondary part 2, then spacing elements 9 of different heights 10 must be chosen before the spacing elements 9 are fitted. The installation height 19 is therefore measured before the spacing elements 9 are fitted, in order to subsequently select and encapsulate the appropriate spacing elements 9. This means that there is no need for machining during the manufacture of the secondary parts 2.

Figure 3:
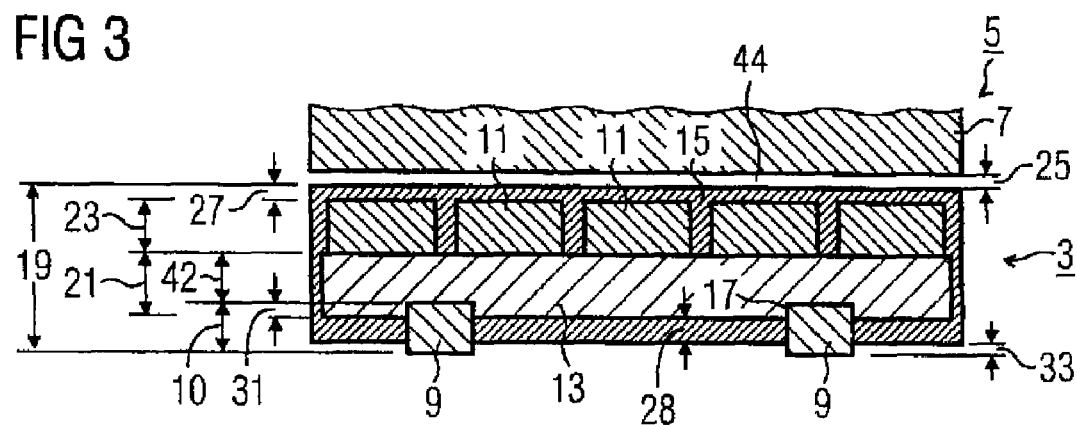
FIG. 3 shows a further schematic cross section through a further exemplary embodiment of a secondary part according to the invention and FIG. 4 shows a perspective illustration of a mount, mounted on a machine bed, for permanent magnets of a secondary part.

The illustration in FIG. 3 once again shows a secondary part 3. A primary part 7 is also indicated, in addition to the secondary part 3, with an air gap with air gap width 25 being located between the primary part 7 and the secondary part 3. The air gap width 25 is the height of the air gap. An electrical machine 5 has the primary part 7 and the secondary part 3. In FIG. 3, the mount 13 has recesses 17 with a depth 31. The spacing elements 9 are integrated in the recesses 17 and have the height 10, with a portion of this height corresponding to the depth 31 of the recess 17, and another portion corresponding to the encapsulation thickness 28, while a third part corresponds to the distance 33 from the bottom. The distance 33 from the bottom is the height of the secondary part 3 by means of which this is raised above the secondary parts according to the prior art.

The spacing elements 9 can be used to compensate for height tolerances of both the mount 13 and of the permanent magnets 11. The recesses 17 are, for example, blind holes which can be produced by means of a drilling process.

In one advantageous method recesses 17 which always result in the same residual thickness 42 in the mount 13 are produced in the mount 13. The residual thickness 42 is the height of the mount 13 in the area of the bottom of the blind hole. For example, a depression which always has the same depth with respect to the upper face of the mount can be drilled in the mount 13 for this purpose. Spacing elements 13 which are manufactured, for example, from a turned part and may have a precisely defined height 10 are adhesively bonded or else pushed into the recesses 17. This results in independence from height tolerances of the mount 13.

One advantage of the invention is that the secondary part 3 can be manufactured with a tight-tolerance installation height 19, allowing the formation of a tight-tolerance air gap 44. Power fluctuations in the EMF are also reduced by reducing geometric fluctuations in the air gap.

If mounts 13 with a shorter height 21 than in the case of previous models of the secondary part 3 are used for secondary parts 3, then the spacing elements 9 allow the installation height 19 to be kept constant. One advantageous feature of the secondary part 3 according to the invention is that the thinner mount 13, for example, reduces the weight of the secondary part.

Since the spacing elements 9 are used to comply with the tolerances for the installation height 19 of the secondary parts 2 and 3, it is now also possible to simplify the production of the permanent magnets 11 since there is no longer any need to grind the upper and lower faces thereof.

Figure 4:
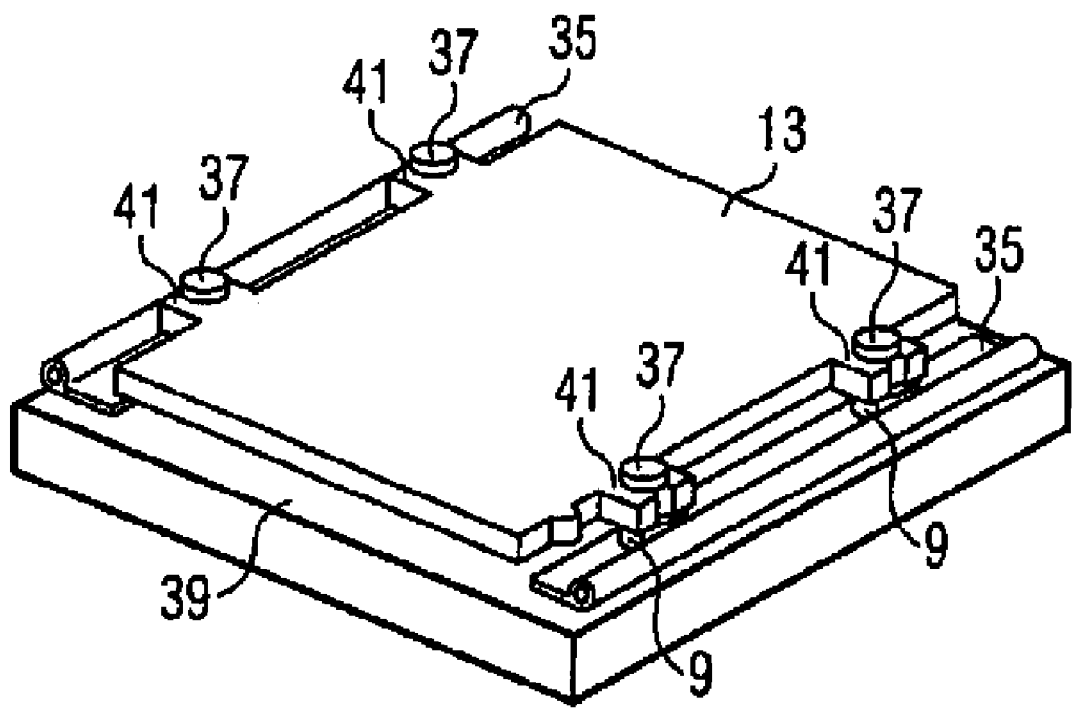

The illustration in FIG. 4 shows a perspective view of a mount 13 mounted on a machine bed.

The mount 13 has an essentially rectangular footprint with rounded edges, and has attachment lugs 41 which project from the rectangular round body at the side and define side open through-holes. This configuration allows the mount 13 to be mounted by means of screws 37 on a mounting strip 35 of a machine bed 39. A plurality of secondary parts can be fitted one behind the other on the machine bed, forming a common secondary part. This is not illustrated in FIG. 4.

What is claimed is:

1. A secondary part of a linear electrical machine, comprising:
    a mount;
    permanent magnets supported on the mount;
    a least one spacing element sized to define an installation height of the secondary part; and
    an encapsulation for embedding the spacing element and the permanent magnets, such that the spacing element projects out of the encapsulation to form together with the encapsulation a surface of the secondary part in an area of the permanent magnet.

2. The secondary part of claim 1, wherein the spacing element is placed adjacent to the mount.

3. The secondary part of claim 1, wherein the spacing element is attached to the mount by an adhesively-bonded joint or by a welded joint.

4. The secondary part of claim 1, wherein the spacing element is made of thermally conductive material, said mount having a recess for receiving at least part of the spacing element.

5. The secondary part of claim 4, wherein the mount has a plurality of recesses of different depths for receiving a plurality of said spacing elements in one-to-one correspondence.

6. The secondary part of claim 1, further comprising a plurality of said spacing elements of different height.

7. The secondary part of claim 1, wherein the encapsulation is provided on a side of the mount which side faces away from the permanent magnets.

8. The secondary part of claim 1, wherein the surface of the secondary part is formed in its entirety by the encapsulation and the at least one spacing element.

9. The secondary part of claim 1, further comprising and a corrosion-resistant material, wherein the surface of the secondary part is formed in its entirety by the encapsulation, the at least one spacing element, and the corrosion-resistant material.

10. A method for production of a secondary part of a linear electrical machine, comprising the step of jointly casting at least one spacing element with a mount with permanent magnets for embedding the spacing element and the permanent magnets in an encapsulation, such that the spacing element projects out of the encapsulation to form together with the encapsulation a surface of the secondary part in an area of the permanent magnets.

11. The method of claim 10, wherein a plurality of said spacing elements are cast jointly with the mount with permanent magnets, with the spacing elements having different height.

12. The method of claim 11, further comprising the step of reducing the height of at least one of the spacing elements.

13. The method of claim 12, wherein the reduction in height is realized through a grinding process or milling process.

14. The method of claim 10, further comprising the step of producing a recess in the mount for holding the spacing element.

15. The method of claim 11, further comprising the step of producing a plurality of recesses of different depth in the mount for holding the spacing elements in one-to-one correspondence.

16. The method of claim 10, further comprising the steps of stamping out a metal plate to form the mount, and attaching the permanent magnets to the mount.

17. A method of making a secondary part, comprising the steps of:
    attaching permanent magnets on one side of a mount;
    attaching a plurality of spacing elements to another side of the mount;
    jointly casting the spacing elements with the mount and the permanent magnets; and
    adjusting a protruding portion of the spacing elements to level the spacing elements.

* * * * *

UNITED STATES PATENT AND TRADEMARK OFFICE
CERTIFICATE OF CORRECTION

| | | |
|---|---|---|
| PATENT NO. | : 7,851,951 B2 | Page 1 of 1 |
| APPLICATION NO. | : 12/088145 | |
| DATED | : December 14, 2010 | |
| INVENTOR(S) | : Thomas Hoppe et al. | |

It is certified that error appears in the above-identified patent and that said Letters Patent is hereby corrected as shown below:

Column 8, line 12, claim 9: after --comprising-- delete "and".

Signed and Sealed this
Eighth Day of March, 2011

David J. Kappos
*Director of the United States Patent and Trademark Office*